(12) United States Patent
Lee et al.

(10) Patent No.: US 7,616,639 B2
(45) Date of Patent: Nov. 10, 2009

(54) TRANSMITTING AND RECEIVING CONTROL PROTOCOL DATA UNIT HAVING PROCESSING TIME INFORMATION

(75) Inventors: Young Dae Lee, Kyoungki-do (KR); Sung Duck Chun, Anyang (KR); Seung June Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 595 days.

(21) Appl. No.: 11/150,314

(22) Filed: Jun. 10, 2005

(65) Prior Publication Data

US 2005/0287957 A1    Dec. 29, 2005

(30) Foreign Application Priority Data

Jun. 14, 2004 (KR) .................... 10-2004-0043754

(51) Int. Cl.
*H04L 12/56* (2006.01)
(52) U.S. Cl. .................................. 370/394
(58) Field of Classification Search ........... 370/394
See application file for complete search history.

(56) References Cited

U.S. PATENT DOCUMENTS

| 6,687,248 | B2* | 2/2004 | Jiang ..................... 370/394 |
| 6,731,623 | B2* | 5/2004 | Lee et al. ............... 370/349 |
| 7,203,196 | B2* | 4/2007 | Jiang ..................... 370/394 |
| 7,325,075 | B1* | 1/2008 | Chiu et al. .............. 709/245 |
| 2002/0172208 | A1 | 11/2002 | Malkamaki |
| 2003/0023916 | A1 | 1/2003 | Reme et al. |
| 2003/0174662 | A1* | 9/2003 | Malkamaki ............. 370/310 |
| 2003/0227875 | A1 | 12/2003 | Wei et al. |
| 2004/0004947 | A1* | 1/2004 | Herrmann et al. ...... 370/338 |
| 2005/0041586 | A1* | 2/2005 | Jiang ..................... 370/236 |
| 2007/0097926 | A1* | 5/2007 | Liu et al. ................ 370/335 |

FOREIGN PATENT DOCUMENTS

| EP | 0991208 A2 | 4/2000 |
| EP | 1326388 A | 7/2003 |
| JP | 13352315 A | 12/2001 |
| JP | 2004-527979 | 9/2004 |

\* cited by examiner

*Primary Examiner*—Derrick W Ferris
*Assistant Examiner*—Omar Ghowrwal
(74) *Attorney, Agent, or Firm*—Lee, Hong, Degerman, Kang & Waimey

(57) ABSTRACT

The present invention relates to transmitting and receiving control protocol data. A transmitter transmits a control protocol unit having processing time information, wherein the processing time information indicates to a receiver of when to process the control protocol data unit. Accordingly, the receiver processes the control protocol data unit according to the processing time information.

26 Claims, 6 Drawing Sheets

FIG.4
Related Art

| D/C | PDU Type | SUFI$_1$ | Oct 1 |
|---|---|---|---|
| | SUFI$_1$ | | Oct 2 |
| | ...... | | |
| | SUFI$_K$ | | |
| | PAD | | Oct N |

FIG.5
Related Art

| R2 | PDU Type | SUFI$_1$ | Oct 1 |
|---|---|---|---|
| | SUFI$_1$ | | Oct 2 |
| | ...... | | |
| | SUFI$_K$ | | |
| | PAD | | Oct N |

FIG.6
Related Art

| D/C | PDU Type | RSN | R1 | Oct 1 |
|---|---|---|---|---|
| | HFNI | | | |
| | HFNI | | | |
| HFNI | | | | |
| | PAD | | | Oct N |

FIG.7

| D/C | Sequence Number | | Oct 1 |
|---|---|---|---|
| Sequence Number | | PDU Type | Oct 2 |
| SUFI$_1$ | | | |
| ...... | | | |
| SUFI$_K$ | | | |
| PAD | | | Oct N |

FIG.8

| R2 | Sequence Number | | Oct 1 |
|---|---|---|---|
| Sequence Number | | PDU Type | Oct 2 |
| SUFI$_1$ | | | |
| ...... | | | |
| SUFI$_K$ | | | |
| PAD | | | Oct N |

FIG.9

| D/C | Sequence Number | | | Oct 1 |
|---|---|---|---|---|
| Sequence Number | | | PDU Type | |
| RSN | R1 | HFNI | | |
| HFNI | | | | |
| HFNI | | | | |
| PAD | | | | Oct N |

FIG.10

| D/C | PDU Type | SUFI$_1$ | | Oct 1 |
|---|---|---|---|---|
| SUFI$_1$ | | | | Oct 2 |
| ...... | | | | |
| SUFI$_K$ | | | | |
| Sequence Number | | | | |
| Sequence Number | | | PAD | Oct N |
| PAD | | | | |

FIG.11

| R2 | PDU Type | SUFI$_1$ | | Oct 1 |
|---|---|---|---|---|
| SUFI$_1$ | | | | Oct 2 |
| ...... | | | | |
| SUFI$_K$ | | | | |
| Sequence Number | | | | |
| Sequence Number | | | PAD | Oct N |
| PAD | | | | |

FIG.12

| D/C | PDU Type | RSN | R1 | Oct 1 |
|---|---|---|---|---|
| HFNI | | | | |
| HFNI | | | | |
| HFNI | | Sequence Number | | |
| Sequence Number | | | | |
| Sequence Number | | | | |
| PAD | | | | Oct N |

TRANSMITTING AND RECEIVING CONTROL PROTOCOL DATA UNIT HAVING PROCESSING TIME INFORMATION

CROSS-REFERENCE TO RELATED APPLICATIONS

Pursuant to 35 U.S.C. § 119(a), this application claims the benefit of earlier filing date and right of priority to Korean Application No. 2004-0043754, filed on Jun. 14, 2004, the contents of which is hereby incorporated by reference herein in its entirety.

FIELD OF THE INVENTION

The present invention relates to transmitting and receiving control protocol data, and more particularly, to transmitting and receiving a control protocol data unit having processing time information, wherein the processing time information informs a receiver of when to process the control protocol data unit.

BACKGROUND OF THE INVENTION

A universal mobile telecommunications system (UMTS) is a third-generation mobile communications system evolving from a global system for mobile communications system (GSM), which is the European standard. The UMTS is aimed at providing enhanced mobile communications services based on the GSM core network and wideband code-division multiple-access (W-CDMA) technologies.

In December 1998, ETSI of Europe, ARIB/TTC of Japan, T1 of the United States, and TTA of Korea formed a Third Generation Partnership Project (3GPP) for creating detailed specifications of the UMTS technology. Within the 3GPP, in order to achieve rapid and efficient technical development of the UMTS, five technical specification groups (TSG) have been created for determining the specification of the UMTS by considering the independent nature of the network elements and their operations.

Each TSG develops, approves, and manages the specification within a related region. Among these groups, the radio access network (RAN) group (TSG-RAN) develops the specifications for the functions, requirements, and interface of the UMTS terrestrial radio access network (UTRAN), which is a new radio access network for supporting W-CDMA access technology in the UMTS.

A related art UMTS network structure 1 is illustrated in FIG. 1. As shown, a mobile terminal, or user equipment (UE) 2 is connected to a core network (CN) 4 through a UMTS terrestrial radio access network (UTRAN) 6. The UTRAN 6 configures, maintains and manages a radio access bearer for communications between the UE 2 and the core network 4 to meet end-to-end quality of service requirements.

The UTRAN 6 includes a plurality of radio network subsystems (RNS) 8, each of which comprises one radio network controller (RNC) 10 for a plurality base stations, or Node Bs 12. The RNC 10 connected to a given base station 12 is the controlling RNC for allocating and managing the common resources provided for any number of UEs 2 operating in one cell. One or more cells exist in one Node B. The controlling RNC 10 controls traffic load, cell congestion, and the acceptance of new radio links. Each Node B 12 may receive an uplink signal from a UE 2 and may transmit a downlink signals to the UE 2. Each Node B 12 serves as an access point enabling a UE 2 to connect to the UTRAN 6, while an RNC 10 serves as an access point for connecting the corresponding Node Bs to the core network 4.

Among the radio network subsystems 8 of the UTRAN 6, the serving RNC 10 is the RNC managing dedicated radio resources for the provision of services to a specific UE 2 and is the access point to the core network 4 for data transfer to the specific UE. All other RNCs 10 connected to the UE 2 are drift RNCs, such that there is only one serving RNC connecting the UE to the core network 4 via the UTRAN 6. The drift RNCs 10 facilitate the routing of user data and allocate codes as common resources.

The interface between the UE 2 and the UTRAN 6 is realized through a radio interface protocol established in accordance with radio access network specifications describing a physical layer (L1), a data link layer (L2) and a network layer (L3) described in, for example, 3GPP specifications. These layers are based on the lower three layers of an open system interconnection (OSI) model that is well known in communications systems.

A related art architecture of the radio interface protocol is illustrated in FIG. 2. As shown, the radio interface protocol is divided horizontally into a physical layer, a data link layer, and a network layer, and is divided vertically into a user plane for carrying data traffic such as voice signals and Internet protocol packet transmissions and a control plane for carrying control information for the maintenance and management of the interface.

The physical layer (PHY) provides information transfer service to a higher layer and is linked via transport channels to a medium access control (MAC) layer. Data travels between the MAC layer and the physical layer via a transport channel. The transport channel is divided into a dedicated transport channel and a common transport channel depending on whether a channel is shared. Also, data transmission is performed through a physical channel between different physical layers, namely, between physical layers of a sending side (transmitter) and a receiving side (receiver).

The second layer includes a MAC layer, a radio link control (RLC) layer, a broadcast/multicast control (BMC) layer and a packet data convergence protocol (PDCP) layer. The MAC layer maps various logical channels to various transport channels. The MAC layer also multiplexes logical channels by mapping several logical channels to one transport channel. The MAC layer is connected to an upper RLC layer via the logical channel. The logical channel can be divided into a control channel for transmitting control plane information a traffic channel for transmitting user plane information according to the type of information transmitted.

The MAC layer is divided into a MAC-b sublayer, a MAC-d sublayer, a MAC-c/sh sublayer, a MAC-hs sublayer and a MAC-e sublayer according to the type of transport channel being managed. The MAC-b sublayer manages a broadcast channel (BCH), which is a transport channel handling the broadcast of system information. The MAC-c/sh sublayer manages common transport channels such as an FACH (Forward Access Channel) or a DSCH (Downlink Shared Channel) that is shared by other terminals. The MAC-d sublayer handles the managing of a DCH (Dedicated Channel), namely, a dedicated transport channel for a specific terminal. In order to support uplink and downlink high speed data transmissions, the MAC-hs sublayer manages an HS-DSCH (High Speed Downlink Shared Channel), namely, a transport channel for high speed downlink data transmission, and the MAC-e sublayer manages an E-DCH (Enhanced Dedicated Channel), namely, a transport channel for high speed uplink data transmissions.

The RLC layer guarantees a quality of service (QoS) of each radio bearer (RB) and handles the transmission of corresponding data. The RLC layer includes one or two independent RLC entities for each RB in order to guarantee a particular QoS of each RB. The RLC layer also provides three RLC modes, namely, a Transparent Mode (TM, an Unacknowledged Mode (UM) and an Acknowledged Mode (AM), to support various types of QoS. Also, the RLC controls the size of data to be suitable for a lower layer in transmitting over a radio interface. For this purpose, the RLC segments and concatenates the data received from the upper layer.

A PDCP (Packet Data Convergence Protocol) layer is a higher layer of the RLC layer and allows the data transmitted through a network protocol (such as an IPv4 or IPv6) to be effectively transmitted over a radio interface with a relatively small bandwidth. To achieve this, the PDCP layer performs a header compression function wherein only necessary information is transmitted in a header part of the data to thereby increase transmission efficiency over the radio interface. Because the PDCP layer performs the header compression as a basic function, it exists only at a packet switched (PS) domain. One PDCP entity is provided per RB to provide an effective header compression function with respect to each PS service.

A BMC (Broadcast/Multicast Control) layer, located at an upper portion of the RLC layer in the second layer (L2), schedules a cell broadcast message and broadcasts the message to terminals located in a specific cell.

A radio resource control (RRC) layer located at the lowest portion of the third layer (L3) is defined in the control plane and controls the parameters of the first and second layers with respect to the establishment, reconfiguration and release of RBs. The RRC layer also controls logical channels, transport channels and physical channels. Here, the RB refers to a logical path provided by the first and second layers of the radio protocol for data transmission between the terminal and the UTRAN. In general, the establishment of the RB refers to stipulating the characteristics of a protocol layer and a channel required for providing a specific data service, and setting their respective detailed parameters and operation methods.

The details of the RLC layer will be now be explained. The RLC layer guarantees a QoS of each RB and transmits data according to the QoS. Because the second layer of the radio protocol provides the RB service to an upper layer, the entire second layer influences the QoS; particularly, the RLC influences the QoS. The RLC establishes an independent RLC entity for every RB in order to assure an intrinsic (unique) QoS of the RB. Various types of QoS are supported by using the TM, the UM and the AM modes. The three RLC modes support different QoS from one another, and different operation methods are used for each mode. The detailed functions thereof are also different.

Each RLC operation mode (TM, UM and AM) will be now explained. First, the TM RLC is a mode in which an RLC SDU transferred from an upper layer does not have any overhead for constructing an RLC PDU. That is, the RLC passes the SDU transparently and hence is named "transparent" mode RLC. The TM RLC with this characteristic performs the following functions in the user plane and the control plane.

In the user plane, because of a short data handling time in the RLC, the TM RLC manages a transmission of real-time circuit data such as voice or streaming data of a circuit service domain (CS domain). While in the control plane, there is no overhead in the RLC such that the TM RLC manages a transmission of an RRC message from a non-specific UE on the uplink and a transmission of an RRC message broadcast to all UEs within a cell on the downlink.

Unlike the TM mode, a mode in which an overhead is added at the RLC is referred to as a non-transparent mode. The non-transparent mode includes an unacknowledged mode (UM), which does not receive an acknowledged response for transmitted data, and an acknowledged mode (AM), which does receive an acknowledged response. The UM RLC sends PDUs, each of which having a PDU header containing a sequence number (SN) added thereto, so as to allow a receiver to know which PDU has been lost during data transmission. By this function, the UM RLC manages in the user plane, a transmission of broadcast/multicast data or real-time packet data such as voice (e.g., VoIP) or streaming data of a PS domain. Simultaneously, the UM RLC manages in the control plane, a transmission of an RRC message, which does not require a reception acknowledged response, among RRC messages transmitted to a specific UE or a specific UE group within a cell.

The AM RLC, similar to the UM RLC, constructs a PDU by adding a PDU header containing the SN and sends the PDU to a receiver. However, unlike the UM RLC, the receiver sends an acknowledgment for the PDU transmitted from a transmitter in the AM RLC. By sending the acknowledgment, the receiver can request the transmitter to retransmit a PDU that was unsuccessfully received. This is the most essential characteristic of the AM RLC.

As a result, the AM RLC aims to guarantee an error-free data transmission by performing retransmissions. Accordingly, the AM RLC manages the transmission of non-real time packet data such as a TCP/IP (Transmission Control Protocol/Internet Protocol) of the PS domain in the user plane. In the control plane, the AM RLC manages a transmission of an RRC message requiring a reception acknowledged response among the RRC messages transmitted to a specific UE within a cell.

Furthermore, regarding the directional properties, the TM RLC and the UM RLC are used for uni-directional communication, while the AM RLC is used for bi-directional communication because of the feedback from the receiver. Bi-directional communication is usually used in a point-to-point communication scheme. Thus, the AM RLC uses only a dedicated logical channel. In addition, in the schematic aspect of the three operational modes, transmission or reception is achieved by one RLC entity in the TM RLC and the UM RLC. However, in the AM RLC, both the transmitter and the receiver each have one RLC entity.

The AM RLC has a complicated scheme because of its retransmission function. The AM RLC includes a retransmission buffer in addition to a transmission/reception buffer for managing retransmissions. In particular, the AM RLC performs various functions such as using a transmitter/receiver window for flow control, using a polling procedure by which a transmitter requests status information from a receiver of a peer RLC entity, reporting status information by which the receiver reports its own buffer state to the transmitter of the peer RLC entity, using a status PDU carrying the status information, using a piggyback procedure to insert the status PDU into a data PDU for increasing the efficiency of data transmissions, as well as other functions.

In the AM RLC, when a serious error is found during an operation of the AM RLC entity, a reset PDU for requesting the AM RLC entity of a counterpart to reset some or all operations and parameters, a reset ACK PDU for providing a response with respect to the reset PDU, or the like, are used. For supporting these functions, the AM RLC must have various protocol parameters, status variables and a timer.

A PDU used for controlling a data transmission in the AM RLC, such as the status information report or the status PDU and the reset PDU, is referred to as a control PDU. A PDU used for transferring user data is referred to as a data PDU. Hence, the PDUs used in the AM RLC are generally divided into data PDUs and control PDUs. The control PDUs are further classified into four different PDUs, namely, a status PDU, a piggybacked status PDU, a reset PDU and a reset ACK PDU.

In general, a reset procedure corresponds to a situation requiring the use of the control PDU. The reset procedure is used for solving erroneous situations at an operation of the AM RLC, such as situations where different sequence numbers are used, or where a PDU (or SDU) has been unsuccessfully transmitted more than a certain number of times. When using the reset procedure, the AM RLCs of the receiver and the transmitter initialize their environment variables to enter into a state that again allows communication.

First, a party that decides to initiate the reset procedure, namely, the AM RLC of the transmitter, transmits to the receiver a reset PDU containing an HFN (Hyper Frame Number) value of its transmitting direction that is currently being used. When the reset PDU is delivered, the AM RLC of the receiver resets the HFN value of its receiving direction and initializes the environment variables such as a sequence number. Also, the AM RLC of the receiver transmits a reset ACK PDU containing the HFN of its transmitting direction to the AM RLC of the transmitter. When the reset ACK PDU is received, the AM RLC of the transmitter resets the HFN value of its receiving direction and then initializes the environment variables.

Hereinafter, the format of an RLC PDU used in an AM RLC entity will be described. FIG. 3 illustrates a format of an AM RLC PDU, a data PDU used when transmitting data. Referring to FIG. 3, the AM RLC PDU is used when the AM RLC entity desires to transmit user data or piggybacked status information and a polling bit. A portion of the user data comprises 8 bits or integer multiples thereof. A header of the AM RLC PDU comprises a sequence number having a size of two octets. Also, a portion of the header of the AM RLC PDU includes a length indicator.

FIG. 4 illustrates a format of a status PDU (STATUS PDU). The status PDU comprises plurality of SUFIs (Super Fields), each of which can be different from one another. A size of the status PDU is variable or restricted to be the same size as the size of the greatest RLC PDU of a logical channel by which the status PDU is transmitted. Here, the SUFIs perform the function of reporting information about which AM RLC PDU has been successfully or unsuccessfully received at the receiving end, or may contain indications necessary for varying a size or a position of a receiver window. Each SUFI is formed of three parts of parameters including a type, a length and a value.

FIG. 5 illustrates a format of a piggybacked status PDU. The piggybacked status PDU has a similar format to that of the status PDU, but it is different therefrom in that a D/C field is substituted for a reserved bit (R2). This piggybacked status PDU is inserted into the AM RLC PDU when the AM RLC PDU has sufficient space remaining therein. Here, the PDU type value is always defined as 000.

FIG. 6 illustrates a format of a reset PDU/reset ACK PDU. The reset PDU contains a sequence number called an "RSN" having a size of one bit. The reset ACK PDU is transmitted as a response for a received reset PDU, whereby the reset ACK PDU is transmitted together with the RSN that is contained in the received reset PDU.

In this case, the parameters used in the PDU format may be indicated as follows.

D/C field: This value informs whether a corresponding PDU is a control PDU or a data PDU.

PDU type: This value informs of a type of the control PDU. Specifically, this value informs whether the corresponding PDU is a reset PDU or a status PDU.

Sequence number: This value refers to sequence number information of the AM RLC PDU.

Polling bit: This value is set when requesting a status report to a receiver.

Extension bit (E): This value refers to whether or not the following octet is a length indicator.

Reserved bit (R1): This value is used for a reset PDU or a reset ACK PDU and coded as 000.

Header extension bit (HE): This value refers to whether the following octet is a length indicator or data.

Length indicator: This value informs of a position of a boundary between different SDUs, if such exists within a data portion of a PDU.

PAD: This portion refers to a padding region that is not used in the AM RLC PDU.

Hereafter, HSDPA (High Speed Downlink Packet Access) technology will be explained. As wireless Internet access technology becomes more popular and subscribers therefore continue to increase, various services related thereto are being provided. Thus, techniques and systems allowing higher transmission rates are needed for supporting these services. In 3GPP, research for enhancing UMTS network technologies and providing higher transmission rates are being conducted. Particularly, the HSDPA (High Speed Downlink Packet Access) system is getting much attention.

Various new techniques have been introduced for supporting the HSDPA. One of these techniques is the HARQ (Hybrid Automatic Repeat Request) technique. The HARQ technique is a retransmission method, which is different from the retransmission method for packets performed by the RLC layer. The HARQ method is used in connection with a physical layer and combines retransmitted data with a previously received data so as to guarantee a higher restoring (decoding) ratio. Specifically, in the HARQ technique, an unsuccessfully transmitted packet is not discarded but stored, and then combined with a retransmitted packet prior to a coding step so as to restore (decode) that packet.

In order to support the HARQ function more effectively, a HARQ block exists in the MAC-hs sublayer of a Node B. The HARQ block includes HARQ entities for managing the HARQ operation of a UE to be supported. Also, one HARQ entity exists with respect to each UE. Furthermore, each HARQ entity has various HARQ processes therein, each process being used for handling the control of the HARQ operations and used for transmitting specific data. Each HARQ process may share and use a plurality of data units, but only one is processed for one TTI (Transmission Time Interval). Therefore, when data transmission is successful, the HARQ process becomes empty and thus may be used for transmitting other data. However, when data transmission is unsuccessful, the HARQ process continues to store the corresponding data until it is successfully transmitted or discarded.

Considering the data transmission in the MAC-hs of the Node B in more detail, the Node B reconstructs (decodes) data units received from the RNC to generate MAC-hs PDUs. The corresponding PDUs are then allocated to each HARQ process. In this case, the MAC-hs PDUs transmitted from each HARQ process may be successfully sent to a UE all at once; however, this may not always be the case.

For instance, assume that a previously generated MAC-hs PDU#1 is allocated to a HARQ process A and a subsequently generated MAC-hs PDU#2 is allocated to a HARQ process B. In general, each HARQ process does not perform transmission simultaneously, but respectively operates independently. Therefore, when the HARQ process A is continuously unsuccessful in transmitting the MAC-hs PDU#1 and the HARQ process B successfully transmits the MAC-hs PDU#2 earlier than the HARQ process A, it may occur that the MAC-hs PDU#2 containing the subsequently generated data (namely, the data that arrives at the Node B later) may be received and processed by the UE earlier than the previously generated MAC-hs PDU#1 and then processed. That is, according to the HARQ process, the MAC-hs PDUs may not always be delivered to the UE in the order in which they were generated at the Node B. As a result, the RLC PDUs contained in the MAC-hs PDU may also not necessarily be delivered to the RLC in sequential order.

The related art has been designed to allow PDUs to arrive at the AM RLC of a receiver in the order that they were transmitted by the AM RLC of a transmitter. That is, in the related art, when the AM RLC of the receiver received a control PDU, that received control PDU was determined to have been transmitted subsequent to a last received RLC PDU, and the received control PDU was immediately processed.

However, as aforementioned, a technique such as HSDPA transmits PDUs by using various HARQ processes at once, such that the PDUs are not delivered to the AM RLC of the receiver in the order that they were transmitted from the AM RLC of the transmitter. This situation is referred to as an 'out of sequence delivery'. In other words, PDUs which should be delivered later may arrive at the receiver earlier than the former generated PDUs. In spite of this, if the AM RLC of the receiver immediately processes a corresponding control PDU as soon as it is delivered, like in the related art, proper communication may not continue, thus leading to serious problems.

For instance, assume that an AM RLC performs a reset procedure. In the reset procedure, the AM RLC of the transmitter first transmits to the receiver a reset PDU, which is a type of control PDU containing the HFN value currently being used for its transmitting direction. Then, upon receiving delivery of the reset PDU, the AM RLC of the receiver resets the HFN value of its receiving direction and also initializes a sequence number thereof.

However, for the AM RLC PDUs transmitted prior to the reset PDU, the HFN values before performing a reset procedure are used. Moreover, the sequence numbers before initialization are used. If the AM RLC PDUs, which have been generated and transmitted prior to the reset PDUs, arrive at the receiver subsequent to the reset PDUs, then the subsequent-arriving AM RLC PDUs would be interpreted to have arrived after the environment variables of the receiver had already been upgraded to new values by the reset PDU. Therefore, the AM RLC of the receiver can not properly restore (decode) the AM RLC PDUs that used previous environment variables before any updating. Furthermore, the AM RLC of the receiver undesirably continues to update the environment variables while being in an erroneous state, and also continues to restore (decode) AM RLC PDUs to be subsequently transmitted thereto by using the erroneous environment variables. As a result, proper communication can no longer be continued.

SUMMARY OF THE INVENTION

The present invention is directed to transmitting and receiving a control protocol data unit having processing time information, wherein the processing time information informs a receiver of when to process the control protocol data unit.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a receiver for receiving a control protocol data unit in a receiving side of a wireless communication system, the receiver comprising means for receiving the control protocol data unit having processing time information associated with the control data unit in a radio link control module and means for processing the control protocol data unit according to the processing time information, wherein the processing time information indicates when to process the control protocol data unit by the receiving side.

Preferably, the processing time information comprises a sequence number associated with a data unit transmitted sequentially with the control protocol data unit from a transmitting side to the receiving side. The data unit and the control protocol data unit are used for at least one of downlink communication and uplink communication. The radio link control module processes the control protocol data unit after processing a data unit having the same sequence number included in the processing time information of the control protocol data unit. Alternatively, the radio link control module processes the control protocol data unit after processing a data unit having a sequence number that is one smaller than the sequence number included in the processing time information of the control protocol data unit.

In one aspect of the present invention, the processing time information comprises a sequence number of a data unit transmitted before the control protocol data unit is transmitted from a transmitting side. The processing time information may also comprise a sequence number that is subsequent to a sequence number of a data unit transmitted before the control protocol data unit is transmitted from a transmitting side. Additionally, the processing time information may comprise a sequence number of a data unit transmitted after the control protocol data unit is transmitted from a transmitting side.

Preferably, the processing time information is positioned in any of a first, a last, or a middle part of the control protocol data unit. The processing time information may be positioned in a super field of the control protocol data unit.

In another aspect of the present invention, the radio link control module is operated in an acknowledged mode. Also, the control protocol data unit is at least one of a status protocol data unit, a piggybacked status protocol data unit, a reset protocol data unit, and a reset acknowledgment protocol data unit.

In a further aspect of the invention, the receiver further comprises means for receiving an instruction from an upper layer indicating to the radio link control module whether to process the control protocol data unit immediately or according to the processing time information.

In another embodiment of the present invention, a transmitter for transmitting a control protocol data unit from a transmitting side of a wireless communication system comprises means for generating a data unit in a radio link control module using data blocks received from an upper layer, means for generating the control protocol data unit having processing time information associated with the control protocol data unit in the radio link control module, wherein the processing time information indicates to a radio link control module of a receiving side when to process the control protocol data unit, and means for transmitting the control protocol data unit and the data unit to the receiving side in at least one of a downlink direction and an uplink direction.

Preferably, the processing time information comprises a sequence number associated with a data unit transmitted sequentially with the control protocol data unit from a transmitting side to the receiving side.

In one aspect of the present invention, the processing time information comprises a sequence number of a data unit transmitted before the control protocol data unit is transmitted from a transmitting side. The processing time information may also comprise a sequence number that is subsequent to a sequence number of a data unit transmitted before the control protocol data unit is transmitted from a transmitting side. Additionally, the processing time information may comprise a sequence number of a data unit transmitted after the control protocol data unit is transmitted from a transmitting side.

Preferably, the processing time information is positioned in any of a first, a last, or a middle part of the control protocol data unit. The processing time information may be positioned in a super field of the control protocol data unit.

In another aspect of the present invention, the radio link control module is operated in an acknowledged mode. Also, the control protocol data unit is at least one of a status protocol data unit, a piggybacked status protocol data unit, a reset protocol data unit, and a reset acknowledgment protocol data unit.

In a further aspect of the invention, the transmitter further comprises means for receiving an instruction from an upper layer indicating to the radio link control module whether to include the processing time information in the control protocol data unit.

In another embodiment of the present invention, a method for receiving a control protocol data unit in a receiving side of a wireless communication system comprises receiving the control protocol data unit having processing time information associated with the control data unit in a radio link control module and processing the control protocol data unit according to the processing time information, wherein the processing time information indicates when to process the control protocol data unit by the receiving side.

Preferably, the processing time information comprises a sequence number associated with a data unit transmitted sequentially with the control protocol data unit from a transmitting side to the receiving side. The data unit and the control protocol data unit are used for at least one of downlink communication and uplink communication. The radio link control module processes the control protocol data unit after processing a data unit having the same sequence number included in the processing time information of the control protocol data unit. Alternatively, the radio link control module processes the control protocol data unit after processing a data unit having a sequence number that is one smaller than the sequence number included in the processing time information of the control protocol data unit.

In one aspect of the present invention, the processing time information comprises a sequence number of a data unit transmitted before the control protocol data unit is transmitted from a transmitting side. The processing time information may also comprise a sequence number that is subsequent to a sequence number of a data unit transmitted before the control protocol data unit is transmitted from a transmitting side. Additionally, the processing time information may comprise a sequence number of a data unit transmitted after the control protocol data unit is transmitted from a transmitting side.

Preferably, the processing time information is positioned in any of a first, a last, or a middle part of the control protocol data unit. The processing time information may be positioned in a super field of the control protocol data unit.

In another aspect of the present invention, the radio link control module is operated in an acknowledged mode. Also, the control protocol data unit is at least one of a status protocol data unit, a piggybacked status protocol data unit, a reset protocol data unit, and a reset acknowledgment protocol data unit.

In a further aspect of the invention, the method further comprises receiving an instruction from an upper layer indicating to the radio link control module whether to process the control protocol data unit immediately or according to the processing time information.

In another embodiment of the present invention, a method for transmitting a control protocol data unit from a transmitting side of a wireless communication system comprises generating a data unit in a radio link control module using data blocks received from an upper layer, generating the control protocol data unit having processing time information associated with the control protocol data unit in the radio link control module, wherein the processing time information indicates to a radio link control module of a receiving side when to process the control protocol data unit, and transmitting the control protocol data unit and the data unit to the receiving side in at least one of a downlink direction and an uplink direction.

Preferably, the processing time information comprises a sequence number associated with a data unit transmitted sequentially with the control protocol data unit from a transmitting side to the receiving side.

In one aspect of the present invention, the processing time information comprises a sequence number of a data unit transmitted before the control protocol data unit is transmitted from a transmitting side. The processing time information may also comprise a sequence number that is subsequent to a sequence number of a data unit transmitted before the control protocol data unit is transmitted from a transmitting side. Additionally, the processing time information may comprise a sequence number of a data unit transmitted after the control protocol data unit is transmitted from a transmitting side.

Preferably, the processing time information is positioned in any of a first, a last, or a middle part of the control protocol data unit. The processing time information may be positioned in a super field of the control protocol data unit.

In another aspect of the present invention, the radio link control module is operated in an acknowledged mode. Also, the control protocol data unit is at least one of a status protocol data unit, a piggybacked status protocol data unit, a reset protocol data unit, and a reset acknowledgment protocol data unit.

In a further aspect of the invention, the method further comprises receiving an instruction from an upper layer indicating to the radio link control module whether to include the processing time information in the control protocol data unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 4 illustrates a format of a status PDU.

FIG. 5 illustrates a format of a piggybacked status PDU.

FIG. 6 illustrates a format of a reset PDU/reset ACK PDU.

FIG. 7 illustrates a format of a status PDU in accordance with a first embodiment of the present invention.

FIG. 8 illustrates a format of a piggybacked status PDU in accordance with the first embodiment of the present invention.

FIG. 9 illustrates a format of a reset PDU/reset ACK PDU in accordance with the first embodiment of the present invention.

FIG. 10 illustrates a format of a status PDU in accordance with a second embodiment of the present invention.

FIG. 11 illustrates a format of a piggybacked status PDU in accordance with the second embodiment of the present invention.

FIG. 12 illustrates a format of a reset PDU/reset ACK PDU in accordance with the second embodiment of the present invention.

DETAILED DESCRIPTION OF THE PREFERRED EMBODIMENTS

Figure 1:
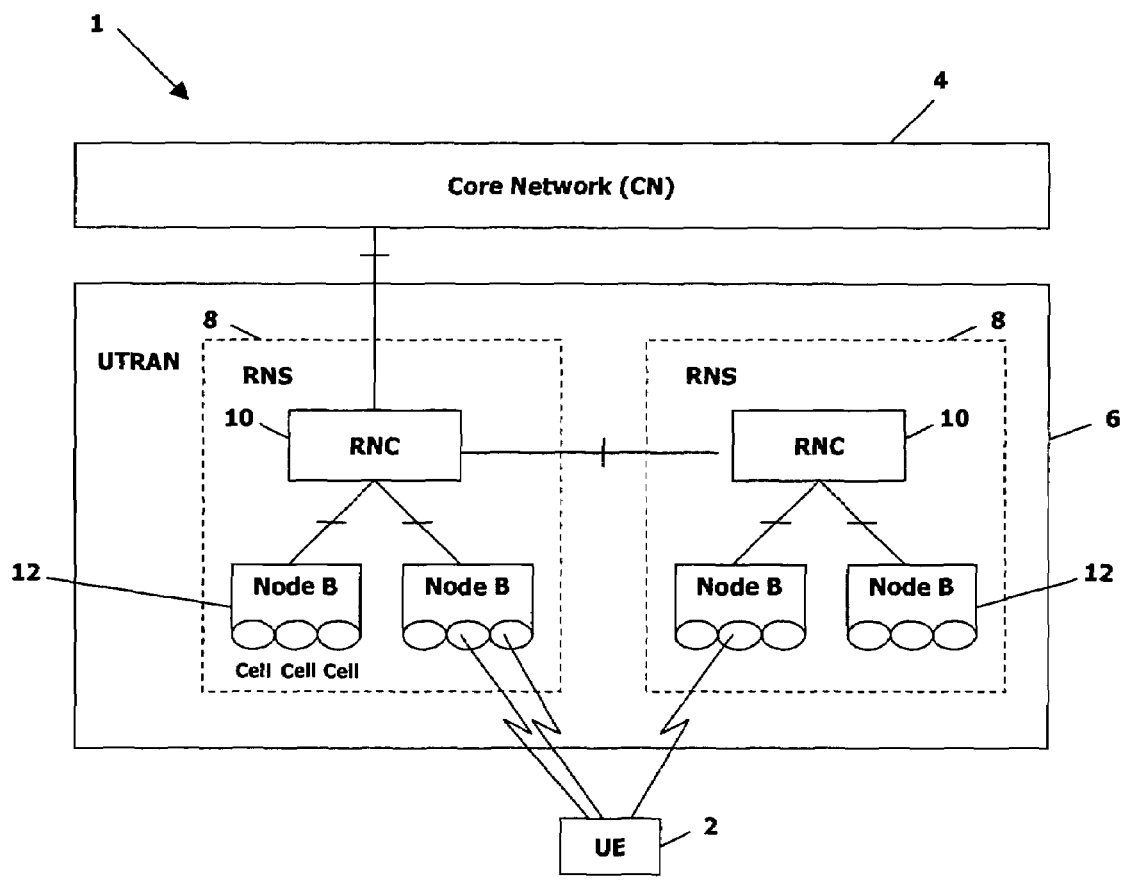
FIG. 1 illustrates a related art UMTS network structure.
Figure 2:
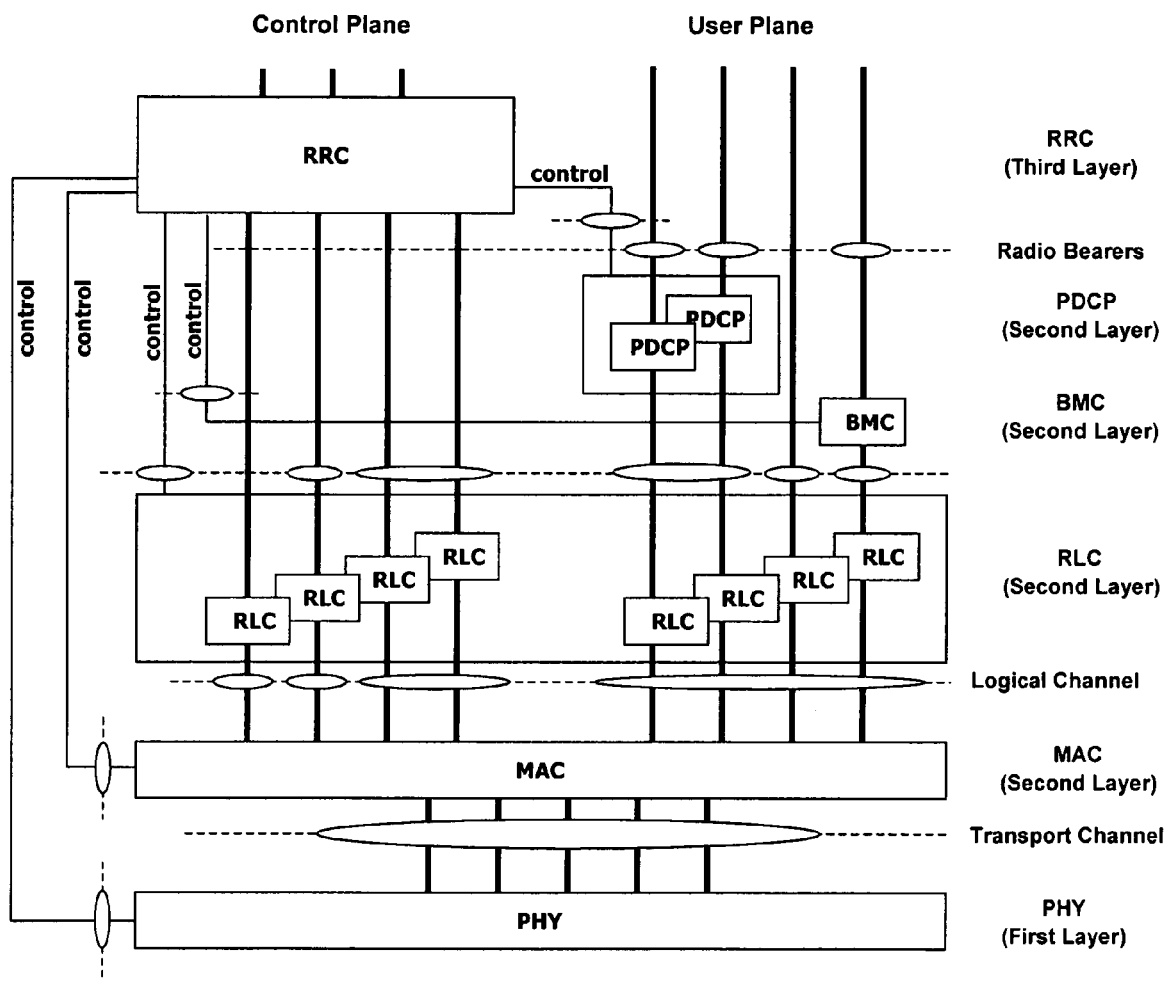
FIG. 2 illustrates a radio protocol architecture used in an UMTS.
Figure 3:
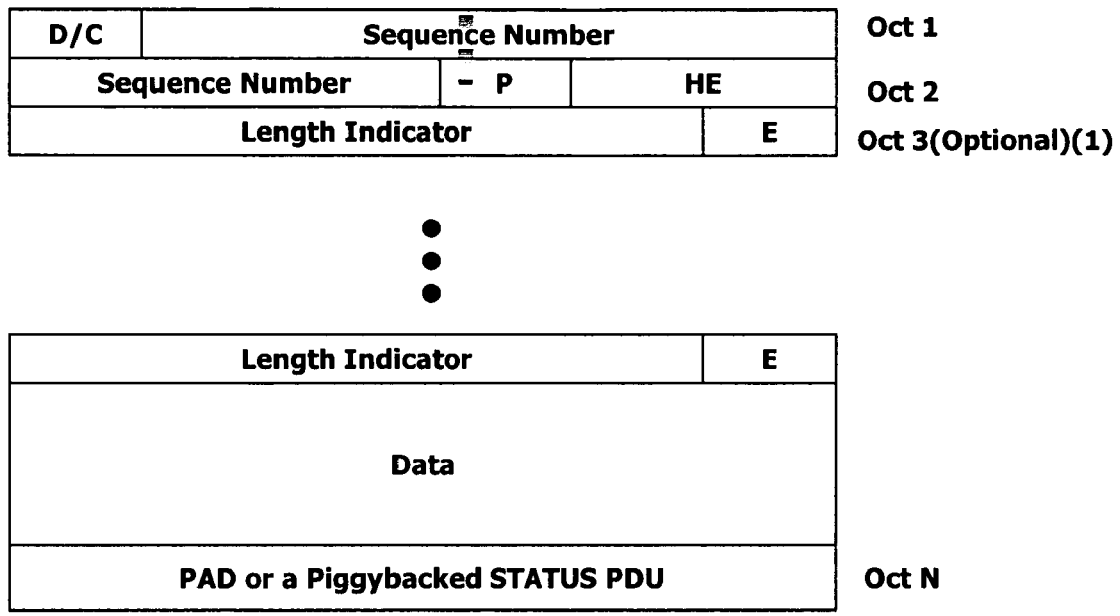
FIG. 3 illustrates a format of an AM RLC PDU.

Reference will now be made in detail to the preferred embodiments of the present invention, examples of which are illustrated in the accompanying drawings. The present invention can be implemented in a mobile communications system such as a UMTS developed by the 3GPP. However, it can also be applied to other types of communication systems.

A problem occurs when a control PDU is delivered to a receiver earlier than a previously generated RLC PDU because the receiver can not know when the control PDU was generated and transmitted. Specifically, the receiver cannot determine the particular RLC PDU after which the control PDU was generated and transmitted. The problem occurs because a transmitter does not inform the receiver of the exact RLC PDU that comes before the control PDU.

To solve the problem, the present invention provides a method for transmitting a control PDU along with processing time information. The processing time information informs a receiver of when the receiver should process the control PDU. Preferably, an AM RLC of a transmitter transmits the control PDU having operation control information therein by including the processing time information. An AM RLC of the receiver processes the control PDU by using the processing time information such that error-free communication is achieved even if RLC PDUs are transmitted out of sequence. Here, it is provided that the receiver and transmitter may be a mobile terminal and a network, respectively, or vice versa.

Preferably, the processing time information may indicate a sequence number of the AM RLC PDU transmitted immediately before the control PDU is transmitted. Alternatively, the processing time information may indicate a sequence number subsequently next to the sequence number of the AM RLC PDU transmitted immediately before the control PDU is transmitted. The processing time information may also indicate a sequence number of an AM RLC PDU transmitted immediately after the control PDU is transmitted.

FIGS. 7 through 9 illustrate formats of a control PDU in accordance with a first embodiment of the present invention. The formats of the control PDU shown in the first embodiment may be used when processing time information is positioned in front of the control PDU. In this embodiment, sequence numbers have been used as the processing time information; however, other types of processing time information may be used as long as processing time information is indicated. Furthermore, the sequence numbers used for the first embodiment have the same size (length) as that of an existing AM RLC PDU. However, the sequence number of the control PDU does not have to be the size (i.e., 12 bits) of the sequence number used for the AM RLC PDU in a data transmission. Preferably, a sequence number of the control PDU having a size less than 12 bits may be used for improving transmission efficiency.

FIGS. 10 through 12 illustrate formats of a control PDU in accordance with a second embodiment of the present invention. The formats of the control PDU shown in the second embodiment may be used when processing time information is positioned in the rear of the control PDU. The above embodiments are merely exemplary, such that the present invention may include different formats of the control PDU having the processing time information located anywhere in a middle part of the PDU as well as being in a first or last part of the PDU.

In addition, in the present invention, in case of a status PDU and a piggybacked status PDU, the processing time information is preferably not included in a header part of the PDU. Rather, the processing time information is informed to the receiver by being indicated as a new SUFI (Super Field).

The SUFI comprises three fields of a type, a length and a value. Preferably, a new value referring to the processing time information may be indicated in the type field and the processing time information may be indicated in the value field. As a result, the processing time information may be flexibly positioned within the status PDU or the piggybacked status PDU.

When the AM RLC of the receiver receives the control PDU, processing of the control PDU is performed by using the processing time information contained in the control PDU. Preferably, the AM RLC of the receiver does not process the control PDU as soon as it is received, but instead, uses the processing time information included in the control PDU to perform processing at the time indicated by the corresponding processing time information.

For example, when the RLC PDU is a data PDU, the AM RLC of the receiver sequentially processes a received RLC PDU according to the sequence numbers included in the data PDU. When the received RLC PDU is a control PDU, the AM RLC of the receiver processes the control PDU according to the processing time information included in the control PDU.

After the AM RLC receives the control PDU, if the processing time information included in the control PDU is a sequence number, the following data processing method may be performed. Preferably, the AM RLC of the receiver initially handles the processing time information. Preferably, the RLC PDU corresponding to an indicated sequence number is processed first, and then the contents included in the control PDU are processed afterward. Alternatively, the RLC PDU corresponding to a sequence number that is one smaller than the indicated sequence number is processed first, and then the contents included in the control PDU are processed afterward.

In the above procedure, when the AM RLC of the receiver processes the processing time information, namely, when the RLC PDU corresponding to the indicated sequence number is processed first and then the contents included in the control PDU are processed afterward, the processing time information corresponds to the sequence number of the RLC PDU transmitted just before the control PDU.

Alternatively, when the AM RLC of the receiver handles the processing time information, namely, when the RLC PDU corresponding to a sequence number that is one smaller than the indicated sequence number is processed first, and then the contents included in the control PDU are processed afterward, the processing time information corresponds to a sequence number that is one greater than the sequence number of the RLC PDU transmitted just before the control PDU.

Furthermore, when the AM RLC of the receiver processes the processing time information, namely, when the RLC PDU corresponding to a sequence number that is one smaller than the indicated sequence number, and then the contents included in the control PDU are processed afterward, the processing time information may correspond to the sequence number of the RLC PDU transmitted immediately after the control PDU.

However, in a system such as the HSDPA system, techniques are used such that an out of sequence delivery does not occur. Therefore, including the processing time information, such as the sequence number, in the control PDU may cause overhead and thereby degrade transmission efficiency. Accordingly, the present invention additionally provides a method for processing AM RLC data according to instructions from an upper layer. Preferably, when the upper layer indicates that a corresponding AM RLC requires the use of processing time information, the AM RLC includes such processing time information when sending the control PDU. Once receiving the control PDU, the AM RLC handles the control PDU by using the processing time information included in the control PDU.

On the other hand, when the upper layer indicates that the AM RLC need not use the processing time information, the processing time information is not included in the transmitted control PDU. When the control PDU arrives at the receiver, the AM RLC may immediately process the control PDU by using the information included in the control PDU.

As described in the present invention, effective communication may be achieved when a control PDU and an RLC PDU are delivered out of sequence by including processing time information in the control PDU, which is referred to by an AM RLC.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to a certain type of wireless communication system. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

As the present invention may be embodied in several forms without departing from the spirit or essential characteristics thereof, it should also be understood that the above-described embodiments are not limited by an of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A receiver for receiving a control protocol data unit in a receiving side of a wireless communication system, the receiver comprising:
    means for receiving the control protocol data unit having processing time information associated with the control data unit in a radio link control module; and
    means for processing the control protocol data unit according to the processing time information, wherein the processing time information indicates when to process the control protocol data unit by the receiving side,
    wherein the processing time information comprises a sequence number associated with a data unit transmitted sequentially with the control protocol data unit from a transmitting side to the receiving side,
    wherein the radio link control module processes the control protocol data unit after processing a data unit having the same sequence number included in the processing time information of the control protocol data unit or the radio link control module processes the control protocol data unit after processing a data unit having a sequence number that is one smaller than the sequence number included in the processing time information of the control protocol data unit,
    wherein the radio link control module is operated in an acknowledged mode (AM) and an instruction is received from an upper layer indicating to the radio link control module whether to include the processing time information in the control protocol data unit,
    wherein the processing time information is positioned in a super field of the control protocol data unit such that the processing time information is flexibly positioned within at least one of a status protocol data unit, a piggybacked status protocol data unit, a reset protocol data unit, and a reset acknowledgment protocol data unit, wherein information in the processing time information other than the sequence number is also used to indicate when to process the control protocol data unit, wherein the super field of the control protocol data unit comprises a type field, a length field, and a value field, and wherein a new value referring to the processing time information is indicated in the type field of the super field and the processing time information is indicated in the value field of the super field.

2. The receiver of claim 1, wherein the data unit and the control protocol data unit are used for at least one of downlink communication and uplink communication.

3. The receiver of claim 1, wherein the processing time information comprises a sequence number of a data unit transmitted before the control protocol data unit is transmitted from a transmitting side.

4. The receiver of claim 1, wherein the processing time information comprises a sequence number that is subsequent to a sequence number of a data unit transmitted before the control protocol data unit is transmitted from a transmitting side.

5. The receiver of claim 1, wherein the processing time information comprises a sequence number of a data unit transmitted after the control protocol data unit is transmitted from a transmitting side.

6. The receiver of claim 1, wherein the processing time information is positioned in any of a first, a last, or a middle part of the control protocol data unit.

7. The receiver of claim 1, wherein the control protocol data unit is at least one of:
   a status protocol data unit;
   a piggybacked status protocol data unit;
   a reset protocol data unit; and
   a reset acknowledgment protocol data unit.

8. A transmitter for transmitting a control protocol data unit from a transmitting side of a wireless communication system, the transmitter comprising:
   means for generating a data unit in a radio link control module using data blocks received from an upper layer;
   means for generating the control protocol data unit having processing time information associated with the control protocol data unit in the radio link control module, wherein the processing time information indicates to a radio link control module of a receiving side when to process the control protocol data unit; and
   means for transmitting the control protocol data unit and the data unit to the receiving side in at least one of a downlink direction and an uplink direction,
   wherein the processing time information comprises a sequence number associated with a data unit transmitted sequentially with the control protocol data unit from the transmitting side to the receiving side,
   wherein the radio link control module processes the control protocol data unit after processing a data unit having the same sequence number included in the processing time information of the control protocol data unit or the radio link control module processes the control protocol data unit after processing a data unit having a sequence number that is one smaller than the sequence number included in the processing time information of the control protocol data unit,
   wherein the radio link control module is operated in an acknowledged mode (AM) and an instruction is received from an upper layer indicating to the radio link control module whether to include the processing time information in the control protocol data unit,
   wherein the processing time information is positioned in a super field of the control protocol data unit such that the processing time information is flexibly positioned within at least one of a status protocol data unit, a piggybacked status protocol data unit, a reset protocol data unit, and a reset acknowledgment protocol data unit,
   wherein information in the processing time information other than the sequence number is also used to indicate when to process the control protocol data unit,
   wherein the super field of the control protocol data unit comprises a type field, a length field, and a value field, and
   wherein a new value referring to the processing time information is indicated in the type field of the super field and the processing time information is indicated in the value field of the super field.

9. The transmitter of claim 8, wherein the processing time information comprises a sequence number of a data unit transmitted before the control protocol data unit is transmitted.

10. The transmitter of claim 8, wherein the processing time information comprises a sequence number that is subsequent to a sequence number of a data unit transmitted before the control protocol data unit is transmitted.

11. The transmitter of claim 8, wherein the processing time information comprises a sequence number of a data unit transmitted after the control protocol data unit is transmitted.

12. The transmitter of claim 8, wherein the processing time information is positioned in any of a first, a last, or a middle part of the control protocol data unit.

13. The transmitter of claim 8, wherein the control protocol data unit is at least one of:
   a status protocol data unit;
   a piggybacked status protocol data unit;
   a reset protocol data unit; and
   a reset acknowledgment protocol data unit.

14. A method for receiving a control protocol data unit in a receiving side of a wireless communication system, the method comprising:
   receiving the control protocol data unit having processing time information associated with the control data unit in a radio link control module; and
   processing the control protocol data unit according to the processing time information, wherein the processing time information indicates when to process the control protocol data unit by the receiving side,
   wherein the processing time information comprises a sequence number associated with a data unit transmitted sequentially with the control protocol data unit from a transmitting side to the receiving side,
   wherein the radio link control module process the control protocol data unit after processing a data unit having the same sequence number included in the processing time information of the control protocol data unit or the radio link control module processes the control protocol data unit after processing a data unit having a sequence number that is one smaller than the sequence number included in the processing time information of the control protocol data unit,
   wherein the radio link control module is operated in an acknowledged mode (AM) and an instruction is received from an upper layer indicating to the radio link control module whether to include the processing time information in the control protocol data unit, wherein the processing time information is positioned in a super field of the control protocol data unit such that the processing time information is flexibly positioned within at least one of a status protocol data unit, a piggybacked status protocol data unit, a reset protocol data unit, and a reset acknowledgment protocol data unit, wherein information in the processing time information other than the sequence number is also used to indicate when to process the control protocol data unit, wherein the super field of the control protocol data unit comprises a type field, a length field, and a value field, and wherein a new value referring to the processing time information is indicated in the type field of the super field and the processing time information is indicated in the value field of the super field.

15. The method of claim 14, wherein the data unit and the control protocol data unit are used for at least one of downlink communication and uplink communication.

16. The method of claim 14, wherein the processing time information comprises a sequence number of a data unit transmitted before the control protocol data unit is transmitted from a transmitting side.

17. The method of claim 14, wherein the processing time information comprises a sequence number that is subsequent to a sequence number of a data unit transmitted before the control protocol data unit is transmitted from a transmitting side.

18. The method of claim 14, wherein the processing time information comprises a sequence number of a data unit transmitted after the control protocol data unit is transmitted from a transmitting side.

19. The method of claim 14, wherein the processing time information is positioned in any of a first, a last, or a middle part of the control protocol data unit.

20. The method of claim 14, wherein the control protocol data unit is at least one of:
   a status protocol data unit;
   a piggybacked status protocol data unit;
   a reset protocol data unit; and
   a reset acknowledgment protocol data unit.

21. A method for transmitting a control protocol data unit from a transmitting side of a wireless communication system, the method comprising:
   generating a data unit in a radio link control module using data blocks received from an upper layer;
   generating the control protocol data unit having processing time information associated with the control protocol data unit in the radio link control module, wherein the processing time information indicates to a radio link control module of a receiving side when to process the control protocol data unit; and
   transmitting the control protocol data unit and the data unit to the receiving side in at least one of a downlink direction and an uplink direction, wherein the processing time information comprises a sequence number associated with a data unit transmitted sequentially with the control protocol data unit from the transmitting side to the receiving side, wherein the radio link control module process the control protocol data unit after processing a data unit having the same sequence number included in the processing time information of the control protocol data unit or the radio link control module processes the control protocol data unit after processing a data unit having a sequence number that is one smaller than the sequence number included in the processing time information of the control protocol data unit, wherein the radio link control module is operated in an acknowledged mode (AM) and an instruction is received from an upper layer indicating to the radio link control module whether to include the processing time information in the control protocol data unit, wherein the processing time information is positioned in a super field of the control protocol data unit such that the processing time information is flexibly positioned within at least one of a status protocol data unit, a piggybacked status protocol data unit, a reset protocol data unit, and a reset acknowledgment protocol data unit, wherein information in the processing time information other than the sequence number is also used to indicate when to process the control protocol data unit, wherein the super field of the control protocol data unit comprises a type field, a length field, and a value field, and wherein a new value referring to the processing time information is indicated in the type field of the super field and the processing time information is indicated in the value field of the super field.

22. The method of claim 21, wherein the processing time information comprises a sequence number of a data unit transmitted before the control protocol data unit is transmitted.

23. The method of claim 21, wherein the processing time information comprises a sequence number that is subsequent to a sequence number of a data unit transmitted before the control protocol data unit is transmitted.

24. The method of claim 21, wherein the processing time information comprises a sequence number of a data unit transmitted after the control protocol data unit is transmitted.

25. The method of claim 21, wherein the processing time information is positioned in any of a first, a last, or a middle part of the control protocol data unit.

26. The method of claim 21, wherein the control protocol data unit is at least one of:
   a status protocol data unit;
   a piggybacked status protocol data unit;
   a reset protocol data unit; and
   a reset acknowledgment protocol data unit.

* * * * *